(12) United States Patent
Chalmers

(10) Patent No.: US 6,546,072 B1
(45) Date of Patent: Apr. 8, 2003

(54) TRANSMISSION ENHANCED SCATTER IMAGING

(75) Inventor: Alexander Chalmers, Norwood, MA (US)

(73) Assignee: American Science and Engineering, Inc., Billerica, MA (US)

(*) Notice: Subject to any disclaimer, the term of this patent is extended or adjusted under 35 U.S.C. 154(b) by 0 days.

(21) Appl. No.: 09/624,450

(22) Filed: Jul. 24, 2000

Related U.S. Application Data
(60) Provisional application No. 60/146,468, filed on Jul. 30, 1999.

(51) Int. Cl.[7] ............................................. G01N 23/04
(52) U.S. Cl. ........................................... 378/57; 378/87
(58) Field of Search .............................. 378/57, 70, 86, 378/87, 51, 62, 63; 250/358.1, 393

(56) References Cited

U.S. PATENT DOCUMENTS

| | | | | |
|---|---|---|---|---|
| 4,768,214 A | * | 8/1988 | Bjorkholm | 378/87 |
| 4,799,247 A | * | 1/1989 | Annis et al. | 378/87 |
| 5,253,283 A | | 10/1993 | Annis et al. | 378/100 |
| 5,974,111 A | * | 10/1999 | Krug et al. | 378/57 |

* cited by examiner

*Primary Examiner*—Robert H. Kim
*Assistant Examiner*—Chih-Cheng Glen Kao
(74) *Attorney, Agent, or Firm*—Bromberg & Sunstein LLP

(57) ABSTRACT

An apparatus and method for enhancing an image of penetrating radiation scattered by objects concealed within a container. An image derived from penetrating radiation transmitted through the container is combined with a scatter image in regard to which it is accurately registered in such a manner as to provide enhanced visibility and photorealism of the combined image.

8 Claims, 4 Drawing Sheets

TRANSMISSION ENHANCED SCATTER IMAGING

This application claims priority from U.S. Provisional Application, Ser. No. 60/146,468 filed Jul. 30, 1999, which is incorporated herein by reference.

TECHNICAL FIELD

The present invention relates to a method for using data obtained by transmission of penetrating radiation through an object to enhance an image of penetrating radiation that has been scattered by the object.

BACKGROUND OF THE INVENTION

X-ray radiography applied to the non-invasive inspection of the contents of containers is a mature technology carried out by a wide variety of methods. An early purpose of x-ray radiography was to produce a high resolution projected image for visual inspection of the contents. In the past decade, as the purposes of the inspection have become targeted to finding specific contraband such as drugs and explosives, methods of dual energy and backscatter radiography have been developed to measure the atomic number of the objects, as have tomographic techniques to measure the density of the objects and coherent scattering methods to measure the crystalline properties of objects.

As used in this description and in any appended claims, the term "image" refers to any multidimensional representation, whether in tangible or otherwise perceptible form or in a computer memory or a storage medium, whereby a value of some characteristic is associated with each of a plurality of locations corresponding to dimensional coordinates of an object in physical space, though not necessarily mapped one-to-one thereonto. The term "image" includes an ordered representation of detector signals corresponding to spatial positions. For example, the image may be an array of values within an electronic memory or holographic medium, or, alternatively, a visual image may be formed on a display device such as a video screen or printer. Thus, for example, the graphic display of the spatial distribution of some feature, such as atomic number, in one or more colors constitutes an image. Similarly, "imaging" refers to the rendering of a stated physical characteristic in terms of one or more images.

Backscatter imaging, in which x-rays scattered by a material in a direction directed generally backward toward the source of radiation are employed, offers several unique inspection capabilities and operational features known in the art. For example, because the scatter signal falls off quite rapidly with increasing depth into the object, backscatter images effectively represent a "slice" of the object characteristic of the side nearest to the x-ray source; this image is frequently useful even when a transmission image representing the same scanned area is hopelessly confused by image clutter.

The underlying physical phenomenon that leads to scattered radiation is the Compton effect. Low atomic number (low Z) materials, which encompass organic materials, interact with x-rays principally by Compton scattering. Narcotic drugs, being among the densest of organic materials, tend to produce the brightest signatures in a backscatter image, as do organic explosives, making backscatter imaging a useful imaging modality for bomb or drug detection.

Backscatter imaging relies upon the direct detection of photons which have been Compton scattered. In the prior art, an image is created that is separate and independent of any transmission image that may be produced at the same time.

SUMMARY OF THE INVENTION

In accordance with one aspect of the invention, in a preferred embodiment, there is provided a method for displaying an image of contents of a container. The method has a step of illuminating the container with at least one beam of penetrating radiation and a step of detecting radiation scattered from the beam of penetrating radiation by the contents of the container for forming a scatter image of the contents of the container. The scatter image is characterized by a plurality of scatter pixels. The method also has a step of detecting radiation from the beam of penetrating radiation transmitted through the contents of the container for forming a transmission image of the contents of the container, the transmission image having a transmission pixel corresponding to each scatter pixel of the scatter image. The method then has a step of forming a combination image having pixels in such a manner that a value is associated with each pixel. The value that is associated with a pixel corresponds to a specified combination of a value associated with each scatter pixel of the plurality of scatter pixels and a value associated with the transmission pixel corresponding to the scatter pixel. The final step of the method is that of displaying the combination image on a display device.

In accordance with other embodiments of the present invention, the beam of penetrating radiation may be a beam of x-rays, and the specified combination of value of each scatter pixel and value of the transmission pixel may be a linear combination of a function of the value associated with the scatter pixel and a function of the value associated with the transmission pixel. The specified combination may include a quadratic function of the value associated with the scatter pixel and a quadratic function of the value associated with the transmission pixel. Furthermore, the value associated with each scatter pixel may be a logarithmic function of an intensity of scattered radiation detected at the scatter pixel. Similarly, the value associated with each transmission pixel may be a logarithmic function of an intensity of transmitted radiation detected at the transmission pixel.

BRIEF DESCRIPTION OF THE DRAWINGS

The foregoing features of the invention will be more readily understood by reference to the following detailed description taken with the accompanying drawings in which.

DETAILED DESCRIPTION OF PREFERRED EMBODIMENTS

Figure 1:
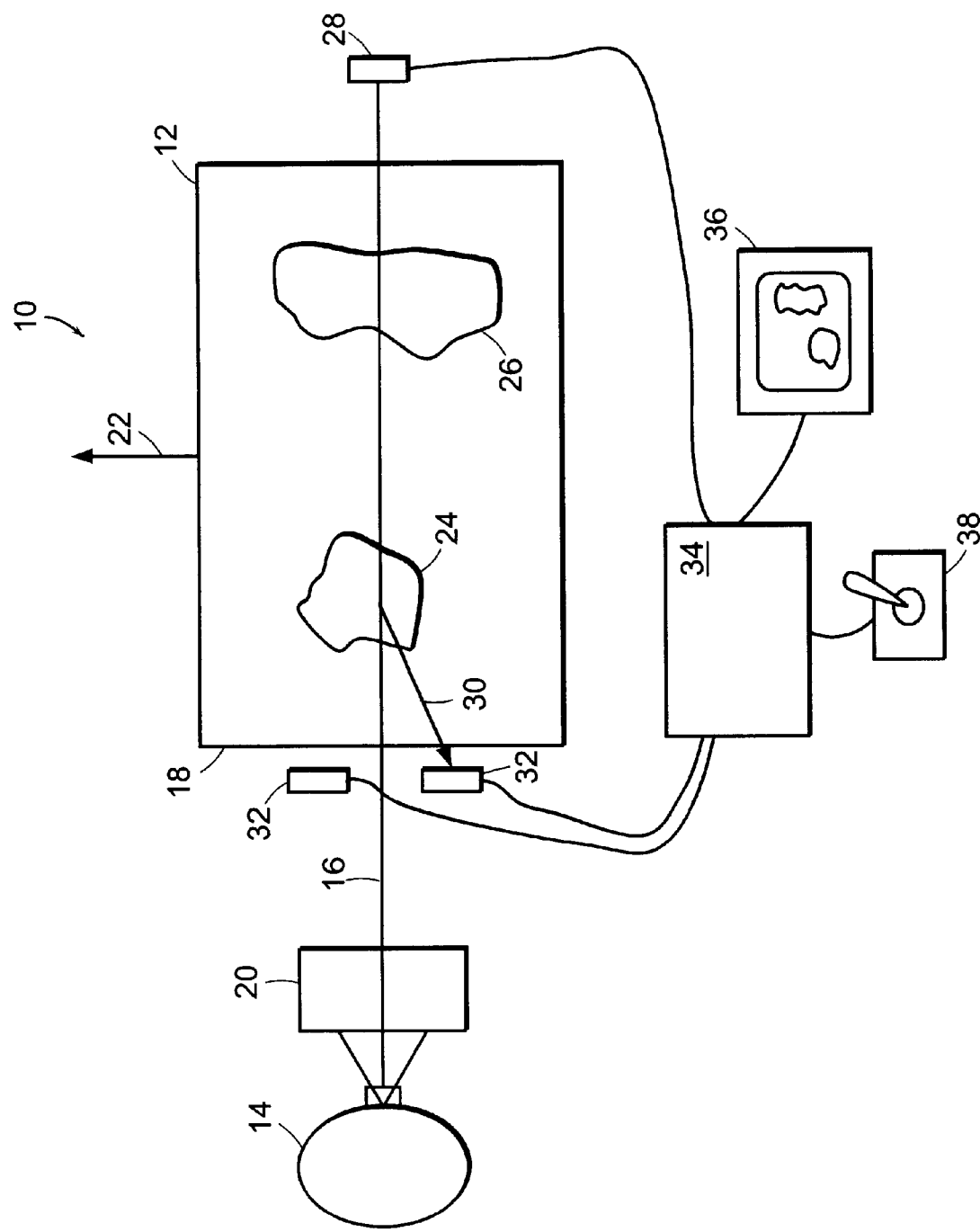
FIG. 1 shows a schematic is shown of a system for imaging an object in penetrating radiation, in accordance with preferred embodiments of the invention.

In accordance with embodiments of the present invention, the same or independent x-ray generators are used to provide sources of penetrating radiation for transmission and scatter images. Referring to FIG. 1, a schematic is shown of a system, designated generally by numeral 10, for imaging an object 12 in penetrating radiation, in accordance with preferred embodiments of the invention. Both a transmission image and a backscatter image may be obtained of the same object or container 12 during a single pass of the container through an inspection system. One or more sources 14 of penetrating radiation may be used for each (transmission and backscatter) modality. Penetrating radiation may include electromagnetic radiation of sufficient energy to allow penetration of container 12, or, alternatively, a beam of particles having mass such as neutrons or charged particles. Source 14 may be any of various sorts of sources of penetrating radiation known to persons skilled in the art, as suited to a particular application. For example, source 14 may be an x-ray tube or, for another example, source 14 may be a linear accelerator used to irradiate a photoemissive surface thereby generating a beam 16 of x-rays. Beam 16 of penetrating radiation has a specified cross-section suited to the requirements of a particular application. In a preferred embodiment of the invention, beam 16 is a pencil beam, having a small cross-section that defines the spatial resolution of the system, as discussed below.

Beam 16 is scanned across surface 18 of container 12, by motion of beam 16, or motion of container 12, or by a combination of the two. For example, source 14 may emit a fan beam, restricted to a flying spot beam by a collimator 20 which varies the position of the beam as a function of time in the plane above and below the page. Container 12 may be translated in a transverse direction 22, by a conveyor belt, for example. Alternatively, beam 16 may be electronically steered in a raster pattern across surface 18 is a sequence of parallel beams using an electronic beam steering source such as described in a copending provisional patent application, U.S.Ser. No. 60/140,767, entitled "Method and Apparatus for Generating Sequential Beams of Penetrating Radiation," filed Jun. 24, 1999, and incorporated herein by reference.

Figure 2:
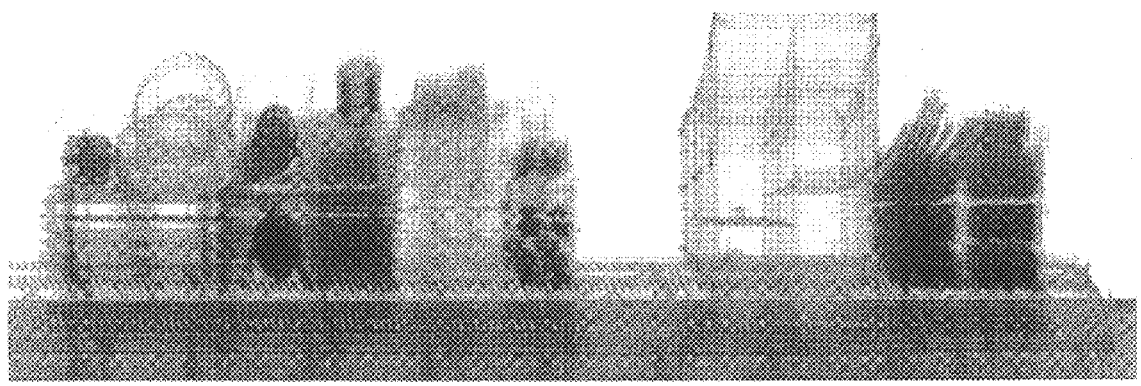
FIG. 2 shows an x-ray transmission image of items on a cargo pallet.
Figure 3:
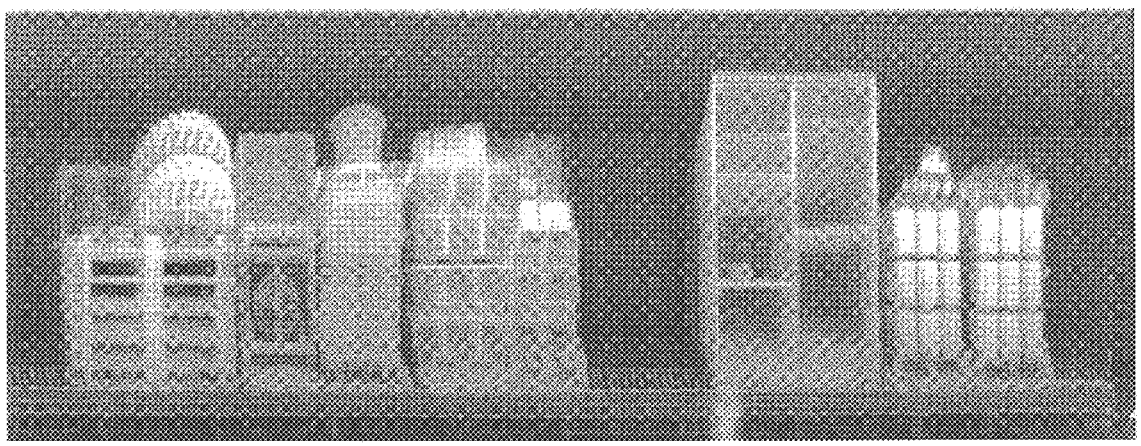
FIG. 3 shows an x-ray scatter image of the items of FIG. 2.

A transmission image showing objects 24 and 26 is obtained by associating a value with the intensity of x-rays detected at transmission detector 28 for each of a finite number of lines of sight through container 12. FIG. 2 depicts an x-ray transmission image of the contents of a cargo pallet. Similarly, a scatter image is obtained by associating a value with the intensity of x-rays 30 detected at one or more scatter detectors 32, again, for each of a finite number of lines of sight through container 12. The term 'scatter' as used herein encompasses scatter into any direction. FIG. 3 depicts an x-ray scatter image of the contents of the cargo pallet of FIG. 2. The sources may be identical or different and the beams used respectively for generating transmission and scatter images may have the same or different energy distributions. Within the scope of the invention, illumination may be contemporaneous, or sequential, or interleaved. In a preferred embodiment, the same pencil beam 16 is used for generating both transmission and scatter images such that registration of the pixels of the respective images is ensured.

Scatter detectors 32 and transmission detector 28 generate electrical signals characterizing the intensity of the penetrating radiation incident on the respective detectors. The signals generated by the respective detectors allow values to be derived by controller 34 which, in turn, are associated with each of the pixels of the scatter and transmission images. Typically, the values associated with each pixel are related to the logarithm of the x-ray intensity incident on each detector.

Controller 34 typically stores the array of values associated with each of the scatter and transmission images. In accordance with preferred embodiments of the present invention, controller 34 also provides for combination of the images. Thus, representing the transmission image by an array denoted T, and representing the scatter image by an array denoted S, a combined image may be formed that is a linear combination of functions of T and S: $C=f(S)+g(T)$. In their most general form, f and g are tensor operators. In accordance with preferred embodiments of the invention, f and g are diagonal operators containing no terms coupling pixels which are not identical, and thus are multiplicative factors.

More generally, within the scope of the present invention, other combinations of a transmission image T and a scatter image S may be advantageous in particular and distinct applications. Examples of such combinations are now described. Generally, the intensity of each transmission pixel is proportional to $\exp\{-\Sigma(\lambda t)_i\}$, where $\lambda$ is the linear absorption coefficient, and t is the thickness of an i-th object in the path. The intensity of a backscatter pixel from an object is, to a first approximation, inversely proportional to $\lambda$. Under the simplifying assumption, for heuristic purposes, of a single object in the beam path, the combination of the logarithm of the transmission intensity with the backscatter intensity yields:

$$C = \ln\left(\frac{I_0}{T}\right) + S \propto \lambda t + \frac{K}{\lambda},$$

where K is a constant.

Similarly, a display of the logarithm of the transmission intensity and the inverse of the backscatter intensity yields:

$$C = \ln\left(\frac{I_0}{T}\right) + S^{-1} \propto \lambda t + K^{-1}\lambda.$$

As a further alternative embodiment of the invention, the ratio of the scatter to transmission intensity may be displayed, yielding:

$$C = \frac{S}{T} \propto \frac{e^{\lambda t}}{\lambda}.$$

Figure 4:
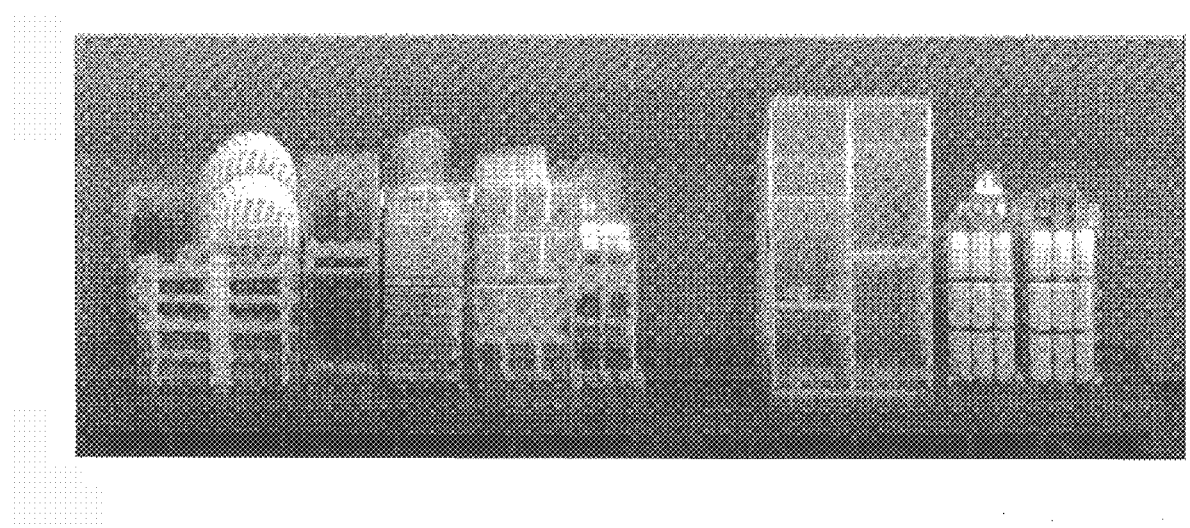
FIG. 4 shows a combined image of the items of FIG. 2, wherein the x-ray backscatter image of FIG. 3 has been enhanced using the x-ray transmission image of FIG. 2 in accordance with an embodiment of the present invention.

In each of the three preceding expressions, T and S have been used to signify the array of intensities of transmitted and scattered radiation. In typical application of the invention, T and S represent logarithms of the intensity of transmitted and scattered radiation respectively. A typical sequence of operations to form the Transmission Enhanced Backscatter Image (TEBI) C would be: a. negate T; b. shift T relative to a fiducial value $T_0$ representing the lowest value of $T_{ij}$; c. square the shifted $(T-T_0I)$; d. square the backscatter image; and e. form the TEBI by adding 8 times S*S to $(T-T_0I)*(T-T_0I)$. FIG. 4 shows a TEBI of the contents of the cargo pallet shown in FIGS. 2 and 3. The combined image can also be processed further, within the scope of the present invention, to highlight specified ranges within the two sets of data using a color pallette or selecting a reduced set from the grayscale TEBI.

The TEBI may then be viewed on a display device which may be a video monitor 36, and, 20 in accordance with alternate embodiments of the invention, the mathematic operators f and g may be adjusted in real time by a person operating controller 34. For example, a user interface 38 may be provided which may include a joystick, touchscreen, trackball, or mouse, to name several examples, the user interface allowing the user to change smoothly the admixture of scatter and transmission images that are being displayed on monitor 36. In particular, display of pure scatter or transmission images may be selected. Alternatively, the TEBI image may be processed electronically in order to give rise to an alarm and to trigger increased scrutiny when specified conditions are detected. The combined image, by virtue of combining shadows and reflected radiation, may provide an effectively three-dimensional and photorealistic image of the contents of a container, and thus advantageously contribute to visualization by an operator of the contents. Images generated by successive combinations of transmitted and scattered images may be stored and/or displayed in the form of an animated file such as a gif file and may be written to a web page and/or displayed remotely by a remotely located computer system.

The electrical output signals produced by detectors 28, and 32 may be processed by controller 34 to derive characteristics such as the geometry, position, density, mass, and effective atomic number of the contents from the scatter signals and transmission signals using algorithms known to persons skilled in the art of x-ray inspection. The use of algorithms, as known in the art of x-ray inspection, for identifying suspect regions within the enclosure, and identification of the presence of a specified condition by means of an alarm or otherwise, is within the scope of the present invention.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for displaying an image of contents of a container, the method comprising:

a. illuminating the container with at least one beam of penetrating radiation;

b. detecting radiation scattered from the beam of penetrating radiation by the contents of the container for forming a scatter image of the contents of the container, the scatter image characterized by a plurality of scatter pixels;

c. detecting radiation from the beam of penetrating radiation transmitted through the contents of the container for forming a transmission image of the contents of the container, the transmission image having a transmission pixel corresponding to each scatter pixel of the scatter image;

d. forming a combination image having pixels, such that a value is associated with each pixel, the value corresponding to a specified combination of a value associated with each scatter pixel of the plurality of scatter pixels and a value associated with the transmission pixel corresponding to the scatter pixel; and e. displaying the combination image on a display device, wherein the specified combination of each scatter pixel and the transmission pixel corresponding to the scatter pixel is a linear combination of a function of the value associated with the scatter pixel and a function of the value associated with the transmission pixel.

2. A method according to claim 1, wherein the specified combination of each scatter pixel and the transmission pixel corresponding to the scatter pixel is a linear combination of a quadratic function of the value associated with the scatter pixel and a quadratic function of the value associated with the transmission pixel.

3. A method according to claim 1, wherein the value associated with each scatter pixel is a logarithmic function of an intensity of scattered radiation detected at the scatter pixel.

4. A method according to claim 1, wherein the value associated with each transmission pixel is a logarithmic function of an intensity of transmitted radiation detected at the transmission pixel.

5. An apparatus for displaying an image of contents of a container, the apparatus comprising:

a. a source of penetrating radiation for illuminating the container with at least one beam of penetrating radiation;

b. a first detector arrangement for detecting radiation scattered from the beam of penetrating radiation by the contents of the container and for forming a scatter image of the contents of the container, the scatter image characterized by a plurality of scatter pixels;

c. a second detector arrangement for detecting radiation from the beam of penetrating radiation transmitted through the contents of the container for forming a transmission image of the contents of the container, the transmission image having a transmission pixel corresponding to each scatter pixel of the scatter image;

d. a processor for combining the transmission image and the scatter image to form a combination image having pixels, such that a value is associated with each pixel, the value corresponding to a specified combination of a value associated with each scatter pixel of the plurality of scatter pixels and a value associated with the transmission pixel corresponding to the scatter pixel; and e. a display device for displaying the combination image, wherein the specified combination of each scatter pixel and the transmission pixel corresponding to the scatter pixel is a linear combination of a function of the value associated with the scatter pixel and a function of the value associated with the transmission pixel.

6. An apparatus in accordance with claim 5, further comprising a user input interface such that a user may vary the specified combination of the value associated with each scatter pixel of the plurality of scatter pixels and the value associated with the transmission pixel corresponding to the scatter pixel.

7. A method according to claim 1, wherein the beam of penetrating radiation is a beam of x-rays.

8. An apparatus according to claim 5, wherein the beam of penetrating radiation is a beam of x-rays.

* * * * *